Jan. 24, 1961
J. R. VANCE ET AL
2,968,932
COOLING DEVICE
Filed July 31, 1958
2 Sheets-Sheet 1
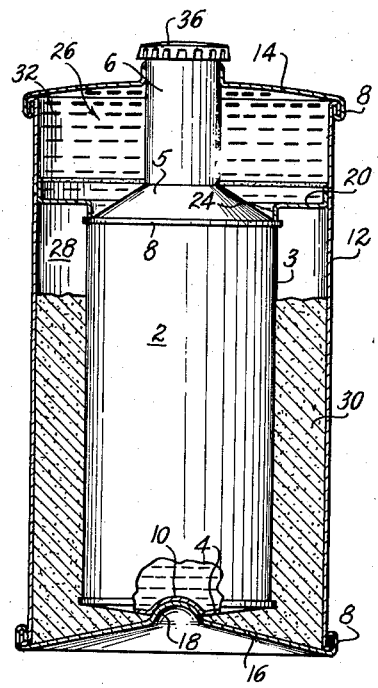
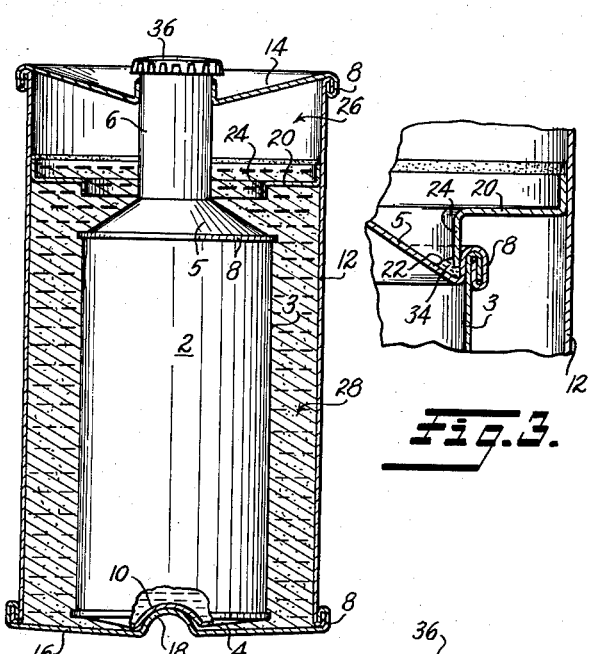
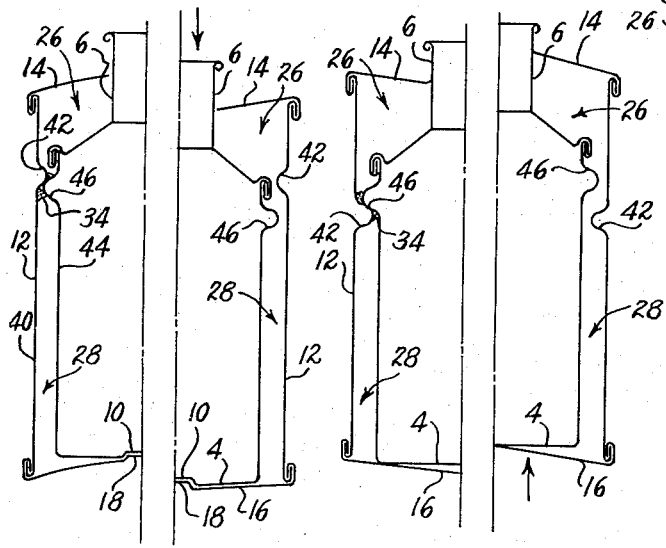
INVENTORS
John R. Vance
William R. Donnelly
BY Bacon & Thomas
ATTORNEYS Jan. 24, 1961   J. R. VANCE ET AL   2,968,932
COOLING DEVICE Filed July 31, 1958

INVENTORS
John R. Vance
William R. Donnelly
BY
Bacon & Thomas
ATTORNEYS

United States Patent Office 2,968,932
Patented Jan. 24, 1961

2,968,932

COOLING DEVICE

John R. Vance, R.R. Box 516, Clayton, Ohio, and William R. Donnelly, 903 Washington Ave., Piqua, Ohio Filed July 31, 1958, Ser. No. 752,337

7 Claims. (Cl. 62—4)

This invention relates primarily to chemical cooling or heating devices, and particularly to such devices adapted for use in cooling or heating foods and beverages. While the disclosure herein relates more specifically to chemical cooling devices, it is to be understood that the principles of the invention are equally well adaptable to chemical heating devices also.

The invention is concerned with apparatus for holding different chemicals separated and sealed from each other but manipulatable to intermix those chemicals, while being retained in a sealed container, for producing endothermic or exothermic reactions. The apparatus may take the form of a single device adapted to be employed to cool or heat an enclosure containing food or the like or it may be incorporated with a food or beverage container to cool (or heat) the food or beverage directly.

Various chemicals, when mixed, undergo endothermic reactions whereby the mixture becomes very cold and absorbs heat from its surroundings. Such chemicals are known and do not constitute a novel part of the present invention. An example, however, is water and ammonium nitrate. When ammonium nitrate and water are mixed the nitrate goes into solution and absorbs a large amount of heat from its surroundings. Even though heat is absorbed merely by dissolving the ammonium nitrate, such phenomena is referred to herein as a "reaction."

In general, the apparatus consists of a closed sealed container, preferably of sheet metal, having at least one end wall resiliently bowed outwardly. The interior of the container is divided into two compartments to keep the chemicals respectively separated until ready for use. A suitable valving arrangement is provided between the compartments and a valve actuator element extends from the valve to the outwardly bowed resilient wall of the container. The valve is sealed in the closed position by means of a frangible sealing material such as wax or the like. When it is desired to use the apparatus the outwardly bowed wall is snapped or sprung inwardly to thus move the valve actuator, break the wax or other seal, and open the valve to permit the chemicals to intermix. For instance, the valve, when open, provides communication between the two compartments so that water in one compartment can flow into the other to mix with a dry chemical therein. The invention contemplates the use of a single container as described above for employment in an insulated food container or the like and also contemplates an arrangement wherein a container such as described is built into or surrounds a container for a beverage. In the latter event the valve means and valve actuator take the form of an inner container in which the beverage to be cooled is sealed In such form the actuator for the valve takes the form of a tubular neck extending from the inner container through the bowed wall of the outer container.

It is therefore an object of this invention to provide apparatus for selectively mixing separate chemicals wherein the entire apparatus is contained in a permanently sealed but distortable container, distortion of which permits intermingling of the chemicals.

Another object of the invention is to provide a device of the type described wherein a container is divided into compartments with valving means therebetween and a frangible sealing material securing and sealing a valve to its seat.

Still another object of the invention is to provide a device of the type set forth wherein an outwardly bowed wall of a container is adapted to be sprung inwardly to actuate a valve means without perforating or unsealing the container.

A further object of the invention is to provide a device of the type set forth combined with a container for food or beverage whereby a direct heat transfer is accomplished between the food and the cooling or heating device.

A still further object of the invention is to provide a device of the type set forth that is economical to manufacture and reliable in operation.

Other and additional objects and advantages will become apparent to those skilled in the art as the description proceeds with reference to the accompanying drawings, wherein:

Fig. 1 is a longitudinal sectional view through one form of device embodying the present invention and showing the parts in their initial relative positions prior to use;

Fig. 2 is a view similar to Fig. 1 but showing the parts in a different or final position;

Fig. 3 is a fragmentary enlarged sectional view of a portion of Fig. 1;

Fig. 4 is a fragmentary vertical sectional view of a device similar to Fig. 1 but somewhat modified in construction;

Figure 11:
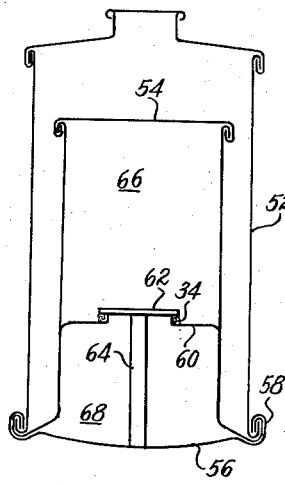
Figure 12:
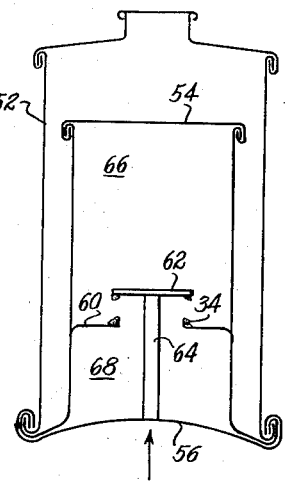
Figure 13:
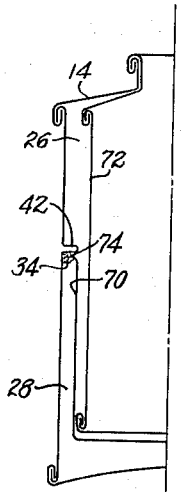
Figure 14:
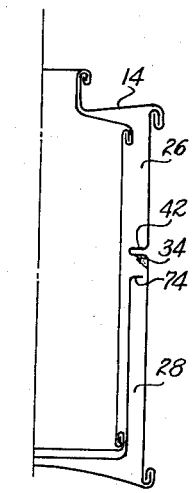

Figs. 5 and 6, Figs. 7 and 8, and Figs. 9 and 10 are, respectively, paired figures schematically illustrating further modifications of the invention showing the parts, respectively, in different relative positions;

Figs. 11 and 12, respectively, schematically illustrate a still further modification; and Figs. 13 and 14 schematically illustrate another form of the invention, the two figures showing the parts in respectively different relative positions.

Throughout the several views like reference numerals are employed to indicate similar or corresponding parts.

Referring first to Figs. 1, 2 and 3, an inner container 2 is shown in the form of a can for containing a beverage. The container 2 is formed of sheet metal and is provided with a generally cylindrical side wall 3, a bottom wall 4, a top wall 5 and a tubular neck portion 6. The various walls and portions of the inner container 2 are preferably joined in the conventional manner as illustrated by the rolled and crimped joint 8 of Fig. 3. The bottom wall 4 of the container is provided with a central depression or concavity 10. An outer container is provided with a generally cylindrical side wall portion 12, an upper end wall 14 and a bottom end wall 16. The end wall 16 is provided with an upward protuberance 18 nested and bearing within the depression 10 in the bottom wall of the inner container. The top wall 14 and bottom wall 16 are preferably joined to the side wall 12 by means of rolled or crimped joints such as the joint 8 previously referred to.

The tubular neck portion 6 of the inner container 2 extends through the top wall 14 and is preferably soldered or otherwise securely sealed thereto. As clearly shown in the drawings, the upper end wall 14 and the lower end wall 16 are both bowed or sprung upwardly and are resiliently held in such positions by the inherent resilience of the material from which they are made. An annular ring 20 is soldered or otherwise secured to the inner face of the side wall 12 of the outer container and extends inwardly therefrom to the region of the junction between the side wall 3 and the end wall 5 of the inner container 2, which junction defines an upwardly facing shoulder having a depression 22 (see Fig. 3) adjacent that junction. The annular ring 20 is provided with a downwardly directed axial flange 24 extending downwardly into the depression 22. The resilience of the end walls 14 and 16 of the outer container hold the lower edge of the flange 24 in seated relation to the depression 22 of the inner container. The flange 24 and elements of the other embodiments corresponding thereto will be referred to hereinafter as means defining a valve seat, and the shouldered portion of the inner container, provided with the depression 22, constitutes a valve means engageable with the said valve seat. With the parts in the position shown in Fig. 1, the annular ring 20 divides the space between the inner and outer containers into an upper compartment 26 and a lower compartment 28. The lower compartment is at least partially filled with a suitable chemical material 30 and the upper compartment is filled with a second chemical 32. In a preferred form of the invention the material 30 is ammonium nitrate and the chemical 32 is plain water. To insure that the water 32 is maintained sealed in its compartment until the device is ready for use, the valve and valve seat portions are sealed by a frangible or rupturable material 34 (see Fig. 3) which is preferably some form of wax and may be one of the brittle wax compositions. The wax constitutes a complete and perfect seal between the compartments but is readily frangible so that the valve may be opened, in a manner to be described.

The nested depression and protuberances 10 and 18 serve to maintain the inner container 2 in centered position within the outer container.

When it is desired to cool the beverage contained in the inner container 2, the user merely supports the outer container and pushes downwardly on the cap 36 sufficiently hard to spring the end walls 14 and 16 downwardly to the position of Fig. 2. This action forces the inner container downwardly to the position shown in Fig. 2 whereby the previously described wax seal is broken and the "valve" is opened so that water 32 is admitted to compartment 28. The action of the end walls 14 and 16 may be described as an "overcenter" snap action. When the parts are forcibly moved to the position of Fig. 2 the resilience of the end walls of the outer container holds the parts in those relative positions.

The intermingling of the water and the chemical 30, which may be ammonium nitrate, results in the absorption of a great amount of heat and results in the rapid cooling of the beverage in the inner container 2. When the beverage in the inner container has cooled sufficiently the cap 36 may be removed and the beverage consumed. Throughout the entire operation described, the outer container 12 remains completely and perfectly sealed so that none of the solution therein can escape. Furthermore, it is not necessary to puncture any part of the device to effect intermingling of the chemicals.

Obviously the particular chemicals employed could be chemicals which react exothermally to give off heat and thus to heat a food or other product in the inner container.

The annular ring 20 of Fig. 1 was described as being soldered to the inner face of the side wall of the outer container. Fig. 4 shows a modified form of construction wherein the annular ring 20 is provided with an upwardly extending cylindrical portion 38 having its upper edge rolled outwardly and incorporated in the rolled and crimped joint 8 previously described. With this form of construction it is not necessary to solder the ring 20 to the side wall 12 since the crimped joint provides a perfect seal. In all other respects the modification of Fig. 4 may be identical to that of Figs. 1 and 2.

Fig. 5 schematically illustrates a form of the invention, showing only one-half of the apparatus, wherein the side wall 40 of the outer container is formed with an inwardly directed annular bead 42 defining a valve seat and the side wall 44 of the inner container is provided with an outwardly extending annular bead 46 defining a valve means engageable with the valve seat 42. With the upper wall 14 sprung or bowed upwardly as shown in Fig. 5, the valve means 46 is held in firm engagement with the valve seat 42 and the frangible sealing material 34 provides a perfect seal between the compartments for containing the different chemicals. Fig. 6 shows the same structure as Fig. 5 but wherein the upper wall 14 has been snapped inwardly to move the valve means 46 away from seat 42 and thus provide communication between the compartments 26 and 28 whereby the chemicals therein may intermix in the manner described.

Figs. 5 and 6 illustrate an arrangement wherein the compartments are sealed off from each other when the upper wall 14 and lower end wall 16 are bowed or sprung upwardly. In Figs. 7 and 8 the end walls 14 and 16 are normally bowed downwardly to hold the valve means 46 of the inner container against the upper surface of the bead 42 of the outer container. When the end walls of the outer container are sprung upwardly, as shown in Fig. 8, the valve is thereupon opened to provide communication between the compartments 26 and 28.

Figures 9, 10:
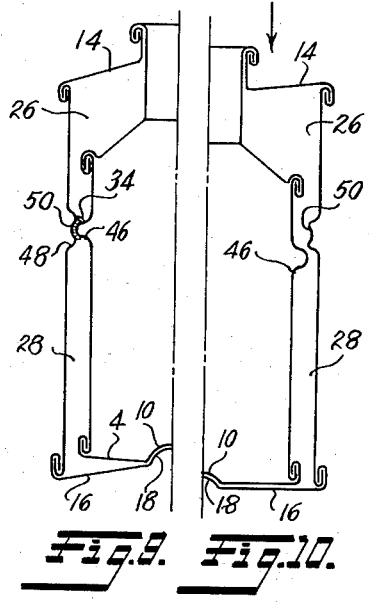

In the form schematically illustrated in Figs. 9 and 10, the side wall of the outer container is provided with an inwardly extending peripheral bead 48, the crest of which is depressed to define an inwardly facing groove 50. The side wall of the inner container is provided with the outwardly directed bead 46, previously described, the crest of which snaps into and out of the groove 50. With the crest of bead 46 in groove 50, the compartments 26 and 28 are sealed from each other, the frangible sealing material 34 being provided in this form also. The upper wall 14 is bowed or sprung upwardly when the bead 46 is seated in groove 50 and may be sprung downwardly to the position of Fig. 10 to unseat the bead 46 from groove 50 and thereby open the "valve" and permit the chemicals in compartments 26 and 28 to intermingle.

In Fig. 11 an outer container 52 contains the beverage or food material. An inner container 54 is formed therewith and the side walls of the inner and outer containers and the common bottom end wall 56 are all sealingly joined at a rolled and crimped joint 58. The inner container 54 is provided with an annular ring means 60 defining an annular valve seat against which a valve disc 62 is seated and sealed by a frangible sealing material such as the wax 34 previously described. The valve disc 62 has secured thereto an actuator or stem 64 which extends to the bottom end wall 56. The inner container is thus divided into two separate sealed compartments 66 and 68 which will be each provided with a suitable chemical as described. The bottom wall 56 is sprung downwardly and is resiliently retained in that position by virtue of the resilience of the material of which it is made. When it is desired to heat or cool the product in the outer container 52, the bottom wall 56 is forcibly sprung upwardly to the position of Fig. 12 and acts through the actuator 64 to rupture the wax seal 34 and move the disc 62 off its seat and thus provide communication between the compartments 66 and 68.

It is to be understood that Figs. 11 and 12 are merely illustrative of a form of the invention wherein a container for the food product is permanently associated with the inner container. It is intended, however, that the inner container 54 may be a separate structure, not associated directly with a food container, and may be employed to cool a compartment in which it is placed.

The form of the invention schematically illustrated in Figs. 13 and 14 is similar to that shown in Figs. 5 and 6 but wherein the valve means 70 is in the form of a cup-like element telescoped over the lower end of the inner container 72 and provided with an outwardly directed flange 74 at its upper end engageable with the bead 42 of the outer container. Thus the flange 74 is sealed to the bead 42 by means of the wax 34 to separate and divide the compartments 26 and 28. When the upper wall 14 is sprung downwardly, as shown in Fig. 14, the flange 74 is pulled away from the bead 42, fracturing the wax 34 in the process, and providing communication between the compartments 26 and 28 for the purpose described.

The specific disclosures herein relate to cylindrical containers but it is to be understood that other shapes may be employed with equal facility. Reference hereafter to sides or side walls of the containers is intended to refer to cylindrical as well as polygonal containers.

While a limited number of embodiments of the invention have been shown and described herein, it is to be understood that the same are merely illustrative, and that the principles of the invention may be embodied in other forms, falling within the scope of the appended claims.

We claim:

1. In a chemical cooling device, a closed sealed container having side walls and opposed end walls, means extending inwardly from said side walls and defining a valve seat, a valve member engaging said seat and thereby dividing the interior of said container into separate compartments having an opening therethrough, frangible sealing material sealing and securing said valve member on said seat, a valve actuator extending from said valve member to one end wall of said container, said one end wall being sealed to said container at its periphery, resilient and bowed outwardly whereby it holds said valve member on said seat and whereby it may be flexed to inwardly bowed condition and thereby act through said actuator to rupture said frangible sealing material and move said valve member off said seat, and different chemical materials in said respective compartments which, when mixed, react endothermally to absorb heat.

2. In a chemical cooling device, a closed sealed container having side walls and opposed end walls, means extending inwardly from said side walls and defining a valve seat, a valve member engaging said seat and thereby dividing the interior of said container into separate compartments, frangible sealing material sealing and securing said valve member on said seat, a valve actuator extending from said valve member to one end wall of said container, said one end wall being resilient and bowed outwardly whereby it holds said valve member on said seat and whereby it may be snapped to inwardly bowed condition and thereby act through said actuator to rupture said frangible sealing material and move said valve member off said seat, and different chemical materials in said respective compartments which, when mixed, react endothermally to absorb heat, said valve member and actuator comprising a hollow container for a beverage or the like, the actuator portion thereof being a tubular neck extending through said one end wall and being sealed and fixed thereto.

3. A device as defined in claim 1 wherein said valve member and actuator comprise a hollow container for a beverage or the like, the actuator portion thereof being a tubular neck extending through said one end wall and being sealed and fixed thereto, said hollow container extending through the opening defined by said valve seat and into engagement with the other end wall, said other end wall being resilient and bowed inwardly.

4. A device as defined in claim 3 wherein said other end wall and the adjacent portion of said hollow container are provided with interengaging means to restrain said hollow container against lateral movement in said closed sealed container.

5. Apparatus for use in a chemical cooling device, comprising; an outer sealed container having sides and resilient end walls, an inner sealed container within said outer container extending between said end walls and being secured to at least one of said end walls and spaced from said side walls to define an annular space therebetween, said end walls being resiliently bowed in one direction and capable of being snapped over center to bow in the other direction whereby to move said inner container axially within said outer container, said inner container having a tubular neck extending through and sealingly fixed to said one end wall, said outer container having means extending inwardly from said side walls into said annular space and defining an annular valve seat, valve means on said inner container and engageable with said valve seat to divide said annular space into two compartments, said end walls being bowed in such direction as to resiliently hold said valve means against said valve seat and snappable to move said valve means away from said valve seat, and frangible sealing means sealing said valve means to said valve seat.

6. A device as defined in claim 5 wherein said inner and outer containers are formed of sheet metal, said means extending inwardly from said outer container and said valve means on said inner container comprising circumferential beads formed in the sheet metal of said containers.

7. A device as defined in claim 5 wherein said means extending inwardly from said outer container comprises a sheet metal ring secured thereto and provided with an axially extending flange at its inner periphery, said inner container having an annular axially facing concave shoulder constituting said valve means and dimensioned to receive the free edge of said flange therein.

References Cited in the file of this patent

UNITED STATES PATENTS

| | | |
|---|---|---|
| 1,833,105 | Aronson | Nov. 24, 1931 |
| 2,579,405 | Sukacev | Dec. 18, 1951 |
| 2,613,664 | Rivoche | Oct. 14, 1952 |
| 2,620,788 | Rivoche | Dec. 9, 1952 |

UNITED STATES PATENT OFFICE
CERTIFICATION OF CORRECTION

Patent No. 2,968,932                  January 24, 1961

John R. Vance et al.

It is hereby certified that error appears in the above numbered patent requiring correction and that the said Letters Patent should read as corrected below.

Column 5, line 26, strike out "having an opening therethrough" and insert the same after "seat" and before the comma in line 24, same column.

Signed and sealed this 6th day of June 1961.

(SEAL)
Attest:

ERNEST W. SWIDER
Attesting Officer

DAVID L. LADD
Commissioner of Patents